Figure 1:
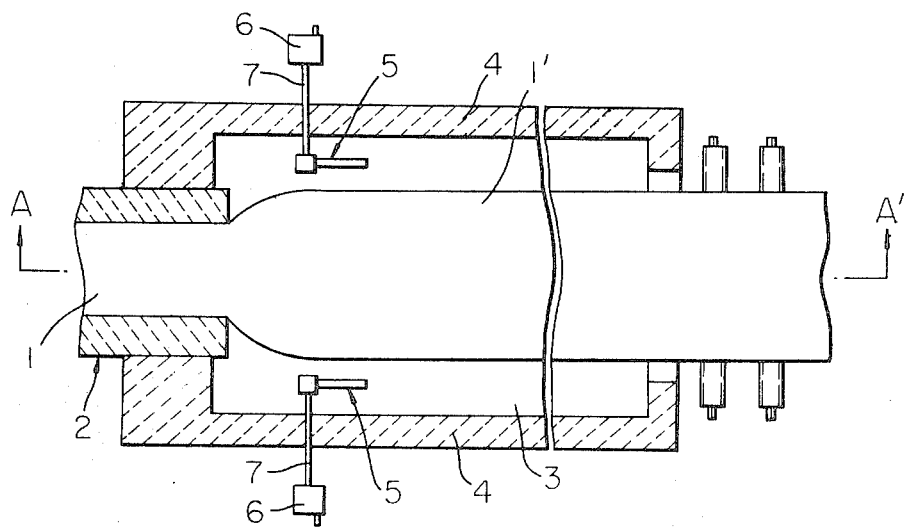

United States Patent

[11] 3,615,316

| | | | | |
|---|---|---|---|---|
| [72] | Inventor | Hideo Kita Maizuru-shi, Japan | [50] | Field of Search.......................... 65/99, 182, 27, 168 |
| [21] | Appl. No. | 736,337 | | |
| [22] | Filed | June 12, 1968 | [56] | References Cited |
| [45] | Patented | Oct. 26, 1971 | | UNITED STATES PATENTS |
| [73] | Assignee | Nippon Sheet Glass Co., Ltd. Osaka, Japan | | |
| [32] | Priority | June 17, 1967 | | |
| [33] | | Japan | | |
| [31] | | 42/38980 | | |

| | | | |
|---|---|---|---|
| 3,334,983 | 8/1967 | Badger et al.................. | 65/182 |
| 3,428,444 | 2/1969 | Swillinger..................... | 65/99 |
| 3,487,659 | 1/1970 | Ito et al......................... | 65/182 |
| 3,489,543 | 1/1970 | Kita et al. .................... | 65/182 |
| 3,520,669 | 7/1970 | Greenler et al............... | 65/27 |

Primary Examiner—S. Leon Bashore
Assistant Examiner—J. B. Hardaway
Attorney—Wenderoth, Lind & Ponack

[54] FLOAT GLASS METHOD AND APPARATUS WITH GAS EXTRACTION MEANS
7 Claims, 5 Drawing Figs.

[52] U.S. Cl...................................................... 65/27, 65/99 A, 65/168, 65/182 R
[51] Int. Cl........................................................ C03b 18/02

ABSTRACT: Glass ribbon is continuously manufactured on a bath of molten metal while preventing the formation of gaseous bubbles in the bath by applying a negative pressure or vacuum to the bath through a gas-permeable, porous material which is nonwettable with the molten metal.

INVENTOR
HIDEO KITA

INVENTOR:
HIDEO KITA

BY Wenderoth, Lind & Ponack.
ATTORNEYS

FLOAT GLASS METHOD AND APPARATUS WITH GAS EXTRACTION MEANS

This invention relates to continuous manufacture of glass ribbon by floating molten glass on a bath of molten metal.

In the continuous manufacture of glass ribbon wherein molten glass is fed onto a bath of molten metal and advanced over the bath, it is conventionally practiced to fill the space above the molten metal bath with inert gas to provide nonoxidizing atmosphere, in order to prevent oxidation of the molten metal in the bath, such as tin or tin alloys. For example, if the nonoxidizing atmosphere is provided by gaseous mixture of nitrogen and hydrogen, mainly hydrogen is dissolved in the molten metal, since hydrogen has greater solubility in tin or tin alloys. As the molten metal flows about in the bath, particularly when the molten metal of relatively high temperature is cooled upon entrance into a relatively low temperature zone, the gas which has been dissolved in the molten metal becomes oversaturated, and comes up to the surface in the form of bubbles. When the bubbles appear under the glass ribbon advancing on the molten metal bath, objectionable scars resembling broken seeds are formed on the lower surface of the ribbon, to degrade the quality of the product. Also when the bubbles appear in the areas other than that under the glass ribbon, the breakage of bubbles causes spattering of molten metal particles, which contaminate the upper surface of the glass ribbon.

The formation of such bubbles can be reduced to a certain degree by, for example, maintaining a low hydrogen content level in the atmosphere. However, such tends to cause insufficient prevention of oxidation of the molten metal.

Accordingly, therefore, the object of the invention is to provide glass ribbon which is free from broken-seedlike scars and other defects, by preventing the formation of bubbles of hydrogen and other gases.

The above object of the invention is accomplished by a process for the continuous manufacture of glass ribbon wherein molten glass is fed onto a bath of molten metal and advanced over the bath, the characteristic feature residing in that the process is practiced while formation of gaseous bubbles in the bath is prevented by application of a negative pressure or vacuum to the bath through a gas-permeable, porous material which is nonwettable with the molten metal.

The invention furthermore provides an apparatus for the continuous manufacture of glass ribbon during which molten glass is fed onto a bath of molten metal and advanced over the bath, the apparatus comprising a tank structure for holding the bath, a hollow member of which at least a part of surface wall being composed of a gas-permeable, porous material which is nonwettable with the molten metal, the said member being so positioned that the outer surface of its porous wall is in contact with the molten metal, an external pumping means, and conduits for connecting the space inside the hollow member with the external pumping means.

In practicing the subject invention, the microscopic portions of the molten metal facing with the pores in the porous wall of the hollow member are exposed to the pressure substantially equivalent to that inside the hollow member. As the result, the gas in the molten metal of said portions are brought to the state of oversaturation and volatilized. Thus freed gas enters into the pores in the wall which is in contact with the molten metal, and is collected inside the hollow member. Since the porous wall is composed of a material which is nonwettable with the molten metal, the pressure on the portions of the molten metal facing the pores is balanced with the surface tension of the metal itself in the vicinity of the entrances of the pores. Thus the molten metal never deeply enters into the pores. Due to the fluid motion of the molten metal and diffusion of the dissolved gas in the molten metal, such portions of the molten metal containing a larger quantity of dissolved gas are incessantly caused to face the pores in the porous wall. Consequently the gas content of the molten metal flowing closely to the porous wall is reduced. In this degased molten metal, the gas remaining therein never becomes oversaturated even when the metal is cooled while advancing under the glass ribbon. Thus the frequency of bubble formation is remarkably reduced. Thus the objectionable phenomena such as the formation of broken seedlike scars on the glass ribbon are effectively prevented.

Serving as preferred form of the gas-permeable, porous material which is nonwettable with the molten metal, porous graphite, and high alumina refractories, etc. are preferably employed in the invention.

The pressure inside the hollow member is maintained at a level lower than the atmospheric pressure on the molten metal bath. Preferably, it is maintained as low as will cause oversaturation of dissolved gas in the molten metal portion contacting with the porous wall of the hollow member. For example, when hydrogen gas is dissolved in the molten metal, it is recommended to maintain the pressure inside the hollow member lower than the partial pressure of hydrogen gas in the atmosphere. Normally the inside pressure may be maintained, in terms of absolute pressure, at the level corresponding to a mercury column height of 0.5–50 mm.

Figure 2:
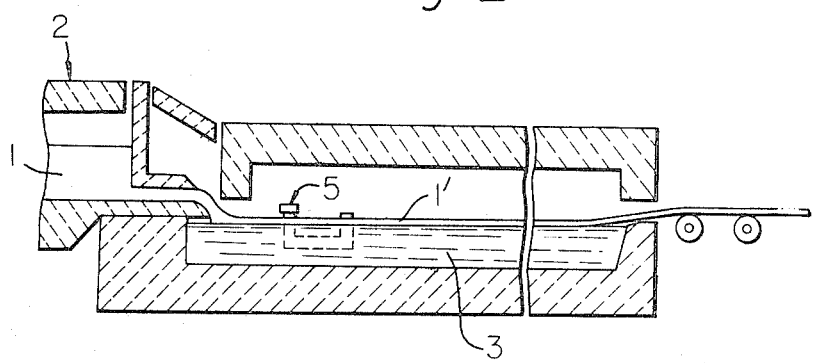
Figure 3:
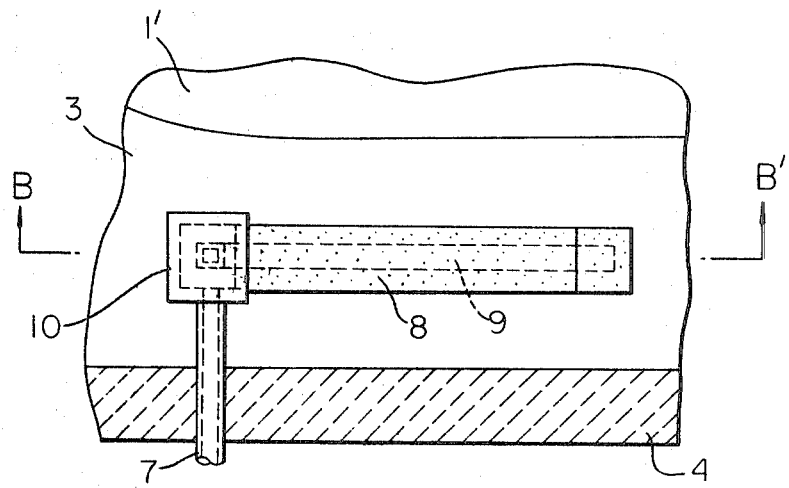
Figure 4:
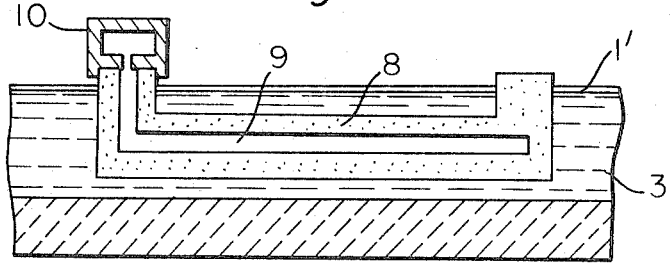

Now referring to the attached drawings, FIG. 1 is a plan view showing one embodiment of the apparatus of the invention. FIG. 2 is a vertical section cut along line A—A' of FIG. 1. FIG. 3 is a partially enlarged view of FIG. 1. FIG. 4 is a vertical section cut along line B—B' of FIG. 3. And FIG. 5 shows a plan view of another embodiment.

With reference to FIGS. 1 and 2, molten glass 1 is fed onto a molten metal bath 3 from forehearth 2 of melting tank, and allowed to freely spread on the bath. Thus formed glass ribbon 1' advances over the bath. A hollow member 5 is sunk in the molten metal between the glass ribbon 1' and the sidewall 4 of the bath. In the drawings, 6 is a suction pump, and 7 is a gas extraction pipe connecting the hollow member 5 with the suction pump 6. A cooling pipe is provided in the suction pump portion to condense the molten metal vapor contained in the sucked gas. The structure of the hollow member 5 is shown in FIGS. 3 and 4, in which 8 is a wall made of porous graphite, 9 is the space inside the hollow member 5 surrounded by the wall 8, and 10 is a gas extraction box. Through this box the space 9 inside the hollow member is connected to the gas extraction pipe 7. The pressure at the space 9 is maintained at a mercury column height of approximately 2 mm., in terms of absolute pressure, by the suction pump 6. In the molten metal bath, the portion of the molten metal under the glass ribbon advances to the same direction with the glass ribbon due to the frictional resistance therewith. Whereas, the molten metal along the bath wall advances to the direction opposite from the glass ribbon. In the vicinity of the entrance of the molten metal bath, the molten metal flowing into the area under the glass ribbon from surrounding areas passes near the hollow member 5. In that case, the gas which is dissolved in the molten metal and composed chiefly of hydrogen is trapped by the space 9 inside the member 5, through the pores in the graphite wall 8. Thus trapped gas passed through the gas extraction box 10 and pipe 7, and is discharged outside the system by means of suction pipe 6. The molten metal containing reduced quantity of gas dissolved therein flows into the area under the glass ribbon, and is gradually cooled as it advances along the glass ribbon, but the gas content thereof never becomes oversaturated. Thus the bubble formation is extremely reduced.

Figure 5:
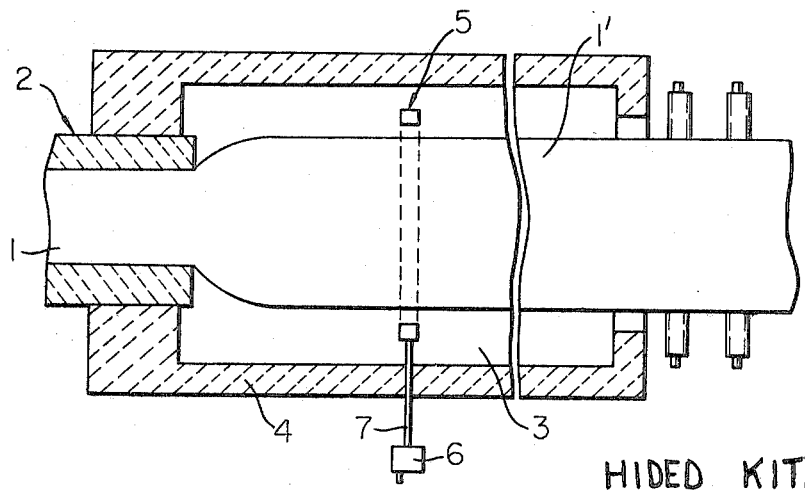

As illustrated in FIG. 5, the hollow member 5 may be located under the glass ribbon 1', over the entire width of the said ribbon. In that case, the molten metal which is advancing along the glass ribbon and being cooled contains the gas as dissolved therein to the point close to saturation, but when the metal passes by the hollow member 5, the dissolved gas is removed.

If the hollow member is cooled by suitable means, the removal of the dissolved gas can be accelerated, since whereby the temperature of the molten metal passing by the hollow member can be lowered, and the system approaches the saturated state.

The gas extraction apparatus in accordance with the invention is small in size and simple of handling. The installation, removal, or change in position of the apparatus can be easily performed. Furthermore, it possesses high gas extraction capacity.

I claim:

1. In a process for the continuous manufacture of glass ribbon wherein molten glass is fed onto a tank-supported bath of molten metal and advanced over the bath, the improvement which comprises the steps of immersing a substantial part of a hollow member at a predetermined desired position in the bath where gas is most likely to form, said hollow member having at least a part of the surface wall thereof composed of a gas-permeable, porous material which is nonwettable by the molten metal; positioning said porous part in contact with and at least partially within the molten metal; and applying a reduced pressure condition to the bath which is lower than the pressure of both the bubbles, and the atmosphere on the bath through the porous hollow member in the bath by maintaining a reduced pressure within the hollow member to absorb and prevent the formation of gaseous bubbles in the bath, which bubbles are detrimental to the glass.

2. The improved process as defined in claim 1 wherein said porous material is porous graphite.

3. The improved process as defined in claim 1 wherein said porous material is a high alumina refractory.

4. The improved process as defined in claim 1 further including applying the reduced pressure at a level of from 0.5–50 mm. Hg. absolute.

5. Apparatus for use in the continuous manufacture of glass ribbon during which molten glass is fed onto a tank-supported bath of molten metal and advanced over the bath, said apparatus comprising a bath of molten metal, a tank structure for holding the bath, a hollow member of which at least a part of the surface wall is composed of a gas-permeable, porous material which is nonwettable by the molten metal, said hollow member being disposed at least partially within said bath with the outer surface of its porous wall in contact with the molten metal, vacuum pumping means disposed exteriorly of the bath, and conduits for connecting the space inside the hollow member with the exteriorly disposed vacuum pumping means.

6. Apparatus as defined in claim 5 wherein the porous material is porous graphite.

7. Apparatus as defined in claim 5 wherein the porous material is a high alumina refractory.